United States Patent
Ridolfo

(10) Patent No.: US 6,492,901 B1
(45) Date of Patent: Dec. 10, 2002

(54) ALARM MANAGEMENT SYSTEM

(75) Inventor: Charles F. Ridolfo, Bloomfield, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/568,471

(22) Filed: May 10, 2000

(51) Int. Cl.[7] .......................... G08B 29/00; G08B 25/00
(52) U.S. Cl. ..................... 340/506; 340/525; 340/511; 340/692; 700/17; 700/27; 700/83
(58) Field of Search ................. 340/506, 525, 340/511, 692, 9, 17; 700/12, 27, 83; 702/188, 183–185, 187

(56) References Cited

U.S. PATENT DOCUMENTS

| 4,064,507 A | * | 12/1977 | Schmitz | 340/692 |
| 4,401,971 A | * | 8/1983 | Saito et al. | 340/692 |
| 4,560,978 A | * | 12/1985 | Lemelson | 340/534 |
| 4,816,208 A | * | 3/1989 | Woods et al. | 340/525 |
| 5,287,390 A | | 2/1994 | Scarola et al. | 376/216 |
| 5,353,315 A | | 10/1994 | Scarola et al. | 376/259 |
| 5,353,316 A | * | 10/1994 | Scarola et al. | 340/825.06 |
| 5,355,395 A | | 10/1994 | Scarola et al. | 700/34 |
| 5,375,150 A | | 12/1994 | Scarola et al. | 376/216 |
| 5,892,440 A | | 4/1999 | Bryan et al. | 340/524 |

* cited by examiner

Primary Examiner—Donnie L. Crosland

(57) ABSTRACT

An alarm management system and method includes structure and function for receiving one or more process parameter signals representative of one or more process parameters. Each of the received process parameters is then compared with an associated alarm point. An alarm status signal is generated on the basis of the comparison. An annunciation command signal is transmitted on the basis of the alarm status signal. And, a sound is then generated on the basis of the annunciation command signal.

34 Claims, 2 Drawing Sheets

ALARM STATUS OVERVIEW

| ALARM CATEGORY | | NUMBER OF ALARMS | | | LINKS | |
|---|---|---|---|---|---|---|
| | | NEW | ACK | RETURNED TO NORMAL | ALARM LIST | MIMIC DISPLAY |
| WORK SCOPE | RO ALARMS | 2 | 4 | 1 | [RO] —62 | |
| | TO ALARMS | 1 | 6 | 2 | [TO] —62 | |
| ALARM PRIORITY | P-1 ALARMS | 1 | 2 | 0 | [P1] —62 | |
| | P-2 ALARMS | 0 | 4 | 2 | [P2] —62 | |
| | P-3 ALARMS | 2 | 4 | 1 | [P3] —62 | |
| PLANT SYSTEM | SYSTEM "A" | 1 | 0 | 0 | [A] —62— | [A] |
| | SYSTEM "B" | 0 | 2 | 1 | [B] —62— | [B] |
| | SYSTEM "C" | 0 | 0 | 0 | [C] —62— | [C] |
| | SYSTEM "N" | 0 | 0 | 1 | [N] —62— | [N] |
| ALL ALARMS | TOTAL NUMBER OF ALARMS | 3 | 10 | 3 | [ALL] —62 | |

FIG. 2

ALARM MANAGEMENT SYSTEM

BACKGROUND OF THE INVENTION

1. Field of the Invention

The present invention relates to an alarm management system. More particularly, the invention relates to a system and method for managing alarms in an industrial facility. Even more particularly, the present invention relates to a system and method for managing a plurality of alarms in a nuclear power plant.

2. Description of Related Art

Day to day operations in most industrial facilities, including nuclear power generation plants, are typically uneventful. However, certain unscheduled events may occur that require the immediate attention of operational personnel. Thus, most process parameter monitoring systems are designed to include some type of warning system to alert operational personnel to an impending, or current, event requiring their attention. More specifically, these systems typically sound an audible alarm to alert operational personnel that a process parameter has exceeded a specified limit.

Some unscheduled events may result in numerous alarms being sounded. These alarms may come from different systems, require differing levels of attention, and require attention by different operational personnel. Thus, when multiple alarms sound simultaneously or in momentary succession, operational personnel must determine what system each alarm is associated with, the priority level of each alarm, and which operator is responsible for attending to each alarm. This may result in confusion, missed alarms, inattention to certain alarms, or a combination of all of these factors, especially if the alarms are spread out around the facility.

Designers have attempted to alleviate the above-mentioned factors to some extent in the nuclear power plant context. Specifically, modern nuclear power plants utilize a centralized control room design having computer-based workstations to allow convenient access to plant controls and functions from a single location. The workstations are divided into assigned operational responsibilities. For example, the reactor operator workstation encompasses controls and functions associated with reactor operations (e.g., primary plant systems including the nuclear reactor), and the turbine operator workstation encompasses controls and functions associated with secondary plant operations (e.g., steam plant systems). When one or more alarm situations occur, an alarm system outputs an audible tone to alert the control room operators. The system further causes the alarms to be depicted on workstation video display units as alarm lists, or highlighted on system mimic diagrams. The alarm lists may be filtered by certain categories such as by alarm priority or by the system in which the alarms occur.

However, even modem centralized control room designs exhibit certain deficiencies. Specifically, when an audible tone is generated upon occurrence of a new alarm, the operators must manually determine which operator has responsibility for the alarm. This is accomplished by manually scanning an alarm list to determine if the new alarm is associated with the reactor operator or the turbine operator. Or, the control room operators must examine the various system mimic diagrams on the video display units to make the determination. Both of these operations are time consuming and distracting.

Additionally, while the alarm lists may be filtered by certain categories, there is no coherent alarm status overview that allows an operator to conveniently observe the overall alarm-state of the plant and how the alarms are distributed.

An operator can readily determine individual alarms and groups of related alarms using the category filtering function, but it is difficult to ascertain the overall plant alarm-state and determine the distribution of the alarms.

Finally, present alarm systems provide no implementation that supports direct access to an operator's desired view of one or more alarms from a high-level plant alarm status overview. For example, an operator may wish to observe a new alarm from different perspectives, such as from an alarm list or from within a system mimic diagram to observe the context of the alarm relative to associated plant components and systems. With present alarm systems, an operator must either manually search through a display menu to select the desired system mimic diagram or manually recall an appropriate alarm list.

Thus, there is a need for an alarm annunciation system that notifies operators immediately, upon the occurrence of one or more alarms, which operator has responsibility for each alarm. There is also a need for an alarm distribution indication system that presents a coherent view of the current plant alarm-state and the distribution of alarms by operator responsibility, priority, and system. There is additionally a need for a device for selectively displaying alarms that supports direct access to an operator's desired view of one or more alarms from a high-level plant alarm status overview. Finally, there is a need for an entire alarm management system that incorporates each of these features.

SUMMARY OF THE INVENTION

In one aspect of the present invention, an alarm management system comprises receiving means, comparing and generating means, receiving and transmitting means, and sound generation means. The receiving means receives one or more process parameter signals representative of one or more process parameters. The comparing and generating means compares each of the received process parameter signals with an associated alarm setpoint and generates an alarm status signal on the basis of the comparison. The receiving and transmitting means receives the alarm status signal and transmits an annunciation command signal on the basis of the received alarm status signal. The sound generation means generates a sound on the basis of the annunciation command signal.

In another aspect of the present invention, an alarm annunciation system comprises receiving and transmitting means, tone generation means, and voice synthesization means. The receiving and transmitting means receives an alarm status signal and transmits an annunciation command signal on the basis of the received alarm status signal. The tone generation means generates a plurality of tones, each having a different frequency from another, on the basis of the annunciation command signal. The voice synthesization means synthesizes a human voice signal of a specified pitch on the basis of the annunciation command signal.

In still a further aspect of the present invention, an alarm distribution indication system comprises memory means, information extraction means, information categorization means, and display means. The memory means stores alarm information of a plurality of alarms. The information extraction means periodically extracts the alarm information from the memory means. The information categorization means categorizes the extracted alarm information into to a plurality of predetermined categories. The display means displays the alarm information, for each of the plurality of alarms, arranged into the plurality of predetermined categories.

In yet another aspect of the present invention, a device for selectively displaying a plurality of alarms, comprises a video display unit, an input selection device, information storage means, information categorization means, mimic display storage and generation means, and information transfer means. The information storage means stores alarm information for each of the plurality of alarms. The information categorization means periodically retrieves and categorizes the stored alarm information into a plurality of predetermined categories. The mimic display storage and generation means stores mimic display information for a plurality of process systems, and periodically retrieves the stored alarm information and generates the mimic display information for each of the plurality of process systems including the retrieved alarm information therein. The information transfer means receives a first command from the input selection device to select information and transfers the selected information to the video display unit for display thereon. The selected information includes one of the alarm information in one of the first plurality of predetermined categories, and the alarm information included in one of the plurality of process system mimic displays.

In yet still a further aspect of the present invention, a method of managing a plurality of alarms includes the steps of receiving, comparing, generating an alarm status signal, receiving the alarm status signal, transmitting an annunciation signal, and generating a sound. In the receiving step, one or more process parameter signals representative of one or more process parameters are received. In the comparing step, each of the received process parameter signals is compared with an associated alarm setpoint. In the alarm status signal generating step, an alarm status signal is generated on the basis of the comparison in the comparison step. The alarm status signal is received in the alarm status signal receiving step. An annunciation command signal is transmitted on the basis of the received alarm status signal, in the annunciation command signal transmission step. A sound is generated on the basis of the annunciation command signal, in the sound generation step.

The present invention provides distinct features and advantages over related alarm management systems and components. Specifically, an alarm annunciation system directs attention to the appropriate operational personnel whenever a new alarm is generated, or when an existing alarm condition returns to normal. Thus, operators are not required to manually determine which operator is responsible for the alarm.

An alarm distribution indication system provides a single display page on a video display unit from which operators can conveniently ascertain the overall alarm state and alarm distribution. Thus, operators do not have to mentally construct an overview of the overall alarm state and distribution by examining and filtering various alarm lists.

Additionally, a device for selectively displaying a plurality of alarms allows operators to conveniently and rapidly access one or more alarms based on a desired contextual view. Thus, operators do not have to manually search through a display menu to select a desired mimic display or manually recall the appropriate alarm list.

These and other features and advantages of the present invention will become more apparent to those skilled in the art when the following detailed description is read in conjunction with the accompanying drawings.

BRIEF DESCRIPTION OF THE DRAWINGS

FIG. 2 depicts a display page showing an alarm status overview that may be viewed on a workstation video display unit.

DETAILED DESCRIPTION OF THE PREFERRED EMBODIMENT

Figure 1:
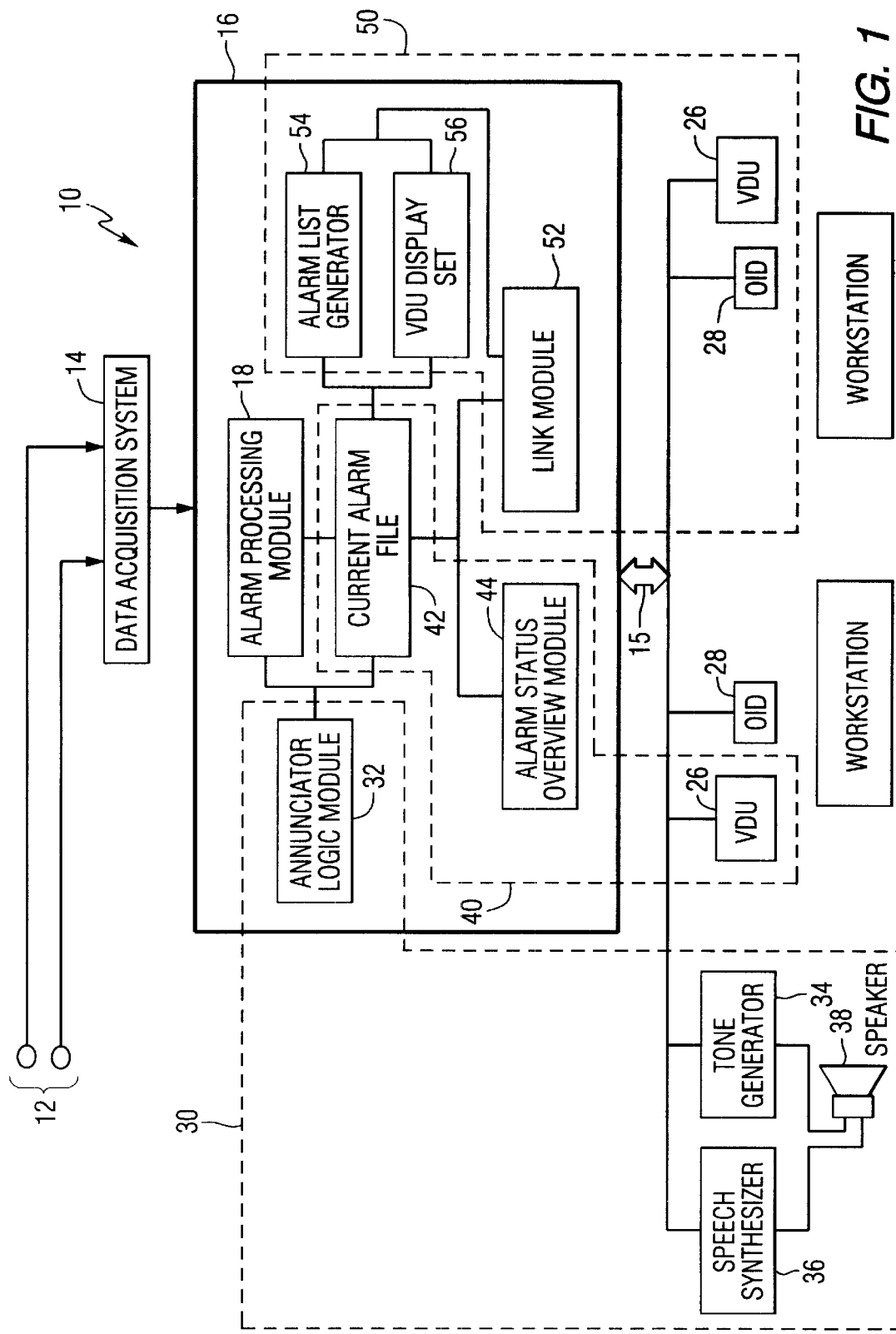
FIG. 1 is a schematic representation of an alarm management system according to the preferred embodiment of the present invention.

The alarm management system 10, depicted schematically in FIG. 1, receives signals from one or more sensors 12. The sensors 12 provide signals indicative of various process parameters within the industrial facility into which the system 10 is installed. In this regard, the term process parameter refers to physical parameters, such as temperature, pressure, flow rates, etc., and also refers to plant component status, such as valve positions, pump rotation speeds, vibration levels, etc. The skilled artisan will appreciate that the number of process parameters, and the specific physical parameters and component statuses, will vary according the application with which the alarm management system 10 is being used. The skilled artisan will further appreciate that various types of sensors known in the art may be used with the present invention.

The signals provided from each sensor 12 are transmitted to a data acquisition system 14, which may be any conventional data acquisition system known in the art. The sensor data is then transmitted from the data acquisition system to a digital computer 16. The digital computer 16 may be a personal computer (PC), a plurality of networked computers, or a main frame computer.

A plurality of alarm video display units 26 are located at operator workstations to display alarm information to operators. The number of alarm video display units 26 will depend upon the number of operators necessary for the particular plant. However, in the preferred embodiment, for a nuclear power plant, the number of workstations and alarm video display units 26 is two, one for the reactor operator and one for the turbine operator. Each operator workstation also includes an operator input device 28, which allows the workstation operator to interface with the digital computer 16. The operator input device 28 may be a trackball, a computer mouse, a touch-screen, a finger-pad, or any other device known to the skilled artisan. The operator input device 28 is used to acknowledge new alarms and clear alarms that have returned to normal. The operator input device 28 is also used to transmit a "link request," discussed further below, to selectively display the alarms in a particular format on the associated alarm video display unit 26. The alarm video display units 26 and operator input devices are connected to the computer 16 via a network connection 15. The network connection 15 may a dedicated network connection or shared with other systems.

Several modules within the computer 16 interact to achieve the desired functionality of the present invention. These modules may be separately designed individual hardware modules, conventional hardware modules programmed to perform specified functions, or may represent software modules which cause the digital computer 16 to perform each of the specified functions. The modules may be grouped into three main subsystems, all of which interact directly or indirectly with an alarm processing module 18. These subsystems shown using dotted lines in FIG. 1, are a directive annunciator subsystem 30, an alarm distribution overview indicator subsystem 40, and an alarm view linker subsystem 50. It should be noted that the alarm video display units 26 and operator input devices 28, which are located at each workstation, are common to both the alarm distribution overview indicator subsystem 40 and the alarm view linker subsystem 50. It should further be noted that these subsystems share certain functional modules and information when integrated together into a system, though each are described herein as separate subsystems. These facts will become apparent from the description of each of these subsystems provided below. It will be further appreciated by the skilled artisan that each of these subsystems could be utilized alone, or in any desired combination, to achieve a desired functional result. In the following description, a description of the operation of the alarm processing module 18 will be provided, followed by a detailed description of each of the subsystems.

Alarm Processing Module

The alarm processing module 18 compares the sensor data received from the data acquisition system 14 to associated alarm setpoints and generates appropriate alarm status signals on the basis of the comparison. The particular alarm status signal generated by the alarm processing module 18 will depend upon whether a datum exceeds a setpoint (a new alarm condition), or a datum that previously exceeded a setpoint is now below the setpoint (a return-to-normal condition). The alarm status signal generated by the alarm processing module 18 also includes various types of classification information to assist operators. This information includes the alarm priority classification, the operational responsibility classification, and the plant system classification.

The priority classification information alerts the operator (or operators) to the relative importance of the alarm. Thus, an operator can readily distinguish between relatively important and unimportant alarms, and thereby prioritize recovery actions to minimize operational impact. The number of priority classifications can be varied to suit the particular use, but in the nuclear power generation context, the preferred number of priority classifications is three. In this respect, the priority classifications are labeled "Priority 1," "Priority 2," and "Priority 3."

Priority 1 alarms are the last, and sometimes only, warning prior to reaching a "Significant Operator Action" condition. These alarms are generally related to the safety and availability of the plant, and include conditions associated with violations of critical reactor safety functions. If such conditions are not corrected immediately, a plant shutdown (manual or automatic), a radioactive release, or major equipment damage, will result.

Priority 2 alarms are the next to last warning prior to reaching a "Significant Operator Action" condition. These alarms include conditions associated with plant technical specification violations that, if not corrected, will result in an eventual plant shutdown, or an eventual radioactive release. Priority 3 alarms are warnings prior to the next to the last warning before reaching a "Significant Operator Action" condition. If no significant operator action can result, these alarms are the only warning.

Priority 3 alarms include conditions that, if left unattended, could result in a subsequent higher priority alarm condition. Such conditions typically indicate equipment or process anomalies.

The operational responsibility classification indicates which operator is responsible to process the alarm. The number of operational classifications can also include any number necessary to meet the requirements of the environment in which the system is being employed. In the nuclear power generation context, however, the preferred number of operational responsibility classifications is two. These classifications are the reactor operator (RO) classification and the turbine operator (TO) classification. Thus, an alarm in the RO classification indicates that the reactor operator is responsible to process the alarm, and an alarm in the TO classification indicates that the turbine operator is responsible.

The plant system classification indicates which plant system the alarm is associated with. Again, the number of system classifications can vary with the application. In the nuclear power generation context, the plant system classification would include, for example, the Chemical and Volume Control System, Reactor Coolant Pumps, Reactor Core, Main Feedwater System, Auxiliary Feedwater System, etc.

The alarm processing module 18 also includes logic to suppress temporary alarms that occur due to plant transients or other momentary disturbances. These temporary alarms are not necessary for safe operation and are considered to be nuisance alarms since they do not reflect actual process parameter abnormalities.

Directive Annunciator Subsystem

The directive annunciator subsystem 30 is comprised of an annunciator logic module 32, a tone generator 34, a speech synthesizer 36, and a speaker 38. The directive annunciator subsystem 30 interacts with other components and subsystems to provide audio notification of new alarm conditions, and return-to-normal conditions. The audio notification also provides appropriate operator responsibility classification information to operators.

Specifically, whenever the alarm processing module 18 determines that a new alarm condition or a return-to-normal condition exists, the alarm processing module 18 sends an updated alarm status signal to the annunciator logic module 32. The annunciator logic module 32 receives the alarm status signal, and the information contained therein, to determine an appropriate audio output command for the specific condition. The appropriate audio output command is sent to both the tone generator 34 and the speech synthesizer 36, via the network 15.

The tone generator 34 produces a plurality of alarm tones of differing frequencies to alert the operator to a new alarm condition, a return-to-normal condition, or to alert the operator that a new alarm has not been acknowledged. The speech synthesizer 36 generates voice messages to direct attention to the proper operational responsibility for both a new alarm condition and a return-to-normal condition. As with the tone generator 34, voice messages of differing frequencies are used to differentiate between the operational responsibility for the alarm. The voice frequencies generated by the speech synthesizer 36 can be selected based on the desired effect and number of differing operational responsibility categories. In the preferred embodiment, however, where the system is used in a nuclear power plant, two different voice frequencies are used. A substantially male sounding voice is used for reactor operator responsibility alarms, and a substantially female sounding voice is used for turbine operator responsibility alarms. The operation of the directive annunciator subsystem will be explained below for various exemplary conditions.

If the alarm processing module 18 determines that a new alarm condition exists, it sends an appropriate signal to the annunciator logic module 32. The annunciator logic module 32 then sends appropriate commands the tone generator 34 and the speech synthesizer 36. The tone generator 34 then generates a momentary tone (e.g., approximately 1 second in duration), to alert the operators to the new alarm condition. Immediately thereafter, the speech synthesizer 36 generates an appropriate sounding voice message directed to the appropriate operator. In the preferred embodiment, if the responsible operator is the reactor operator, the voice message would be a substantially male sounding voice stating, "New reactor alarm(s)." If the responsible operator is the turbine operator, the voice message would be a substantially female sounding voice stating, "New turbine alarm(s)." Moreover, if several new alarms occur simultaneously, some being the reactor operator's responsibility and some being the turbine operator's responsibility, the voice message would state, "New reactor alarm(s) and new turbine alarm(s)." In this instance, a substanatially male sounding voice is used for the former part of the message (e.g., "New reactor alarm(s)"), and a substantially female sounding voice for the latter part (e.g., "and new turbine alarm(s).").

Upon receipt of the tone and voice message, the appropriate operator can then view the alarm(s) on the associated alarm video display unit 26, and use the operator input device 28 associated with the workstation to acknowledge the alarm. The operator can then take appropriate action. When the operator acknowledges the new alarm using the operator input device 28, the alarm information in the current alarm file 42 is updated to reflect this acknowledgement.

If the alarm processing module 18 determines that one or more return-to-normal conditions exist, it sends an appropriate signal to the annunciator logic module 32. The annunciator logic module 32 in turn commands the tone generator 34 and speech synthesizer 36 to generate an appropriate tone followed by an appropriate voice message, respectively. Specifically, a tone different from the new alarm condition tone is momentarily generated (e.g., for approximately 1 second) by the tone generator 34. Then, the voice synthesizer 36 outputs a voice message of appropriate frequency. For instance, in the preferred embodiment of the invention, if the return-to-normal condition is associated with a reactor operator responsibility alarm, the voice message would be a substantially male sounding voice stating, "Cleared reactor alarm(s)." Likewise, if the return-to-normal condition is associated with a turbine operator responsibility alarm, the voice message would be a substantially female sounding voice stating, "Cleared turbine alarm(s)." Finally, if the return-to-normal condition is associated with a plurality of alarms, some being associated with the reactor operator's responsibility and some being associated with the turbine operator's responsibility, the voice message would state, "Cleared reactor alarm(s) and cleared turbine alarm(s)." Again, in this instance a substanatially male sounding voice is used for the former part of the message (e.g., "Cleared reactor alarm(s)"), and a substantially female sounding voice for the latter part (e.g., "and cleared turbine alarm(s).").

Upon receipt of the tone and voice message, the appropriate operator can then use the operator input device 28 associated with the workstation to clear the alarm. When the operator clears the alarm, the alarm information in the current alarm file 42 is updated to reflect that it is cleared.

As noted above, upon receipt of a new alarm condition or a return-to-normal condition, as appropriately annunciated by the new alarm tone and voice message, the operator uses the operator input device 28 to acknowledge the alarm or the return-to-normal condition. If either condition is not acknowledged within a predetermined period of time, the directive annunciator subsystem 30 provides a reminder notification to the operator.

To generate the reminder notification, the alarm processing module 18 periodically scans the information in the current alarm file 42 to determine if any alarm conditons have not been acknowledged or return-to-normal conditions have not been cleared. If either of these conditions exists, the alarm processing module 18 directs an appropriate alarm status signal to the annunciator logic module 32. The annunciator logic module 32 then commands the tone generator 34 and voice synthesizer 36 to generate an appropriate tone and voice message, respectively. Specifically, a momentary tone having a unique frequency, would be followed immediately by an appropriate voice message. For instance, in the preferred embodiment, for unacknowledged alarms or uncleared (return-to-normal) conditions associated with reactor operator responsibility, the voice message would state, "Unacknowledged (Uncleared) reactor alarm(s)." For unacknowledged alarms or uncleared (return-to-normal) conditions associated with turbine operator responsibility, the voice message would state, "Unacknowledged (Uncleared) turbine alarm(s)." And, for a plurality of unacknowledged (uncleared) alarms, some being associated with the reactor operator's responsibility and some being associated with the turbine operator's responsibility, the voice message would state, "Unacknowledged (Uncleared) reactor alarm(s) and unacknowledged (uncleared) turbine alarm(s)." Once again, in this instance a substanatially male sounding voice is used for the former part of the message (e.g., "Unacknowledged (Uncleared) reactor alarm(s)"), and a substantially female sounding voice for the latter (e.g., "and unacknowledged (uncleared) turbine alarm(s).").

If new alarms occur before a previous alarm is acknowledged, the new alarm will be initially annunciated with the appropriate tone and voice message. The reminder tone will be periodically output thereafter until all unacknowledged alarms have been acknowledged. The similar function occurs if new return-to-normal conditions occur before previous ones are cleared.

Alarm Distribution Overview Indicator

The alarm distribution overview indicator subsystem 40 comprises the current alarm file 42, an alarm status overview module 44, and one or more alarm video display units 26. The alarm distribution overview indicator subsystem 40 interacts with other subsystem modules to provide a coherent status overview of overall alarm status. In other words, how the alarms are distributed. This function of this subsystem will now be described.

The alarm status overview module 44 periodically searches through the alarm information stored in the current alarm file 42. The search periodicity is not critical to the inventive concept, but in the preferred embodiment it is approximately every second. The stored information includes the alarm status information (e.g., whether the alarm is new; whether the alarm, if new, has been acknowledged; and whether the alarm has returned-to-normal). And, as discussed previously, the stored information also includes the information associated with the each alarm's priority classification, operational responsibility classification, and plant system classification. The alarm status overview module 44, during the search period, extracts the information and arranges it according to both its status and classification. The information so arranged by the alarm status overview module 44 is then sent to one or more of the alarm video display units 26.

An exemplary display page 60 view of the alarm status overview that a alarm video display unit 26 would provide is illustrated in FIG. 2. An operator viewing this display page 60 is presented with an overall alarm distribution summary, according to each alarm's status and its specific operational responsibility (or "Work Scope"), alarm priority, and system classifications. Thus, within each of the specific classifications, the display page 60 depicts the number of alarms that are new, acknowledged, and returned-to-normal. The display page 60 also depicts the total number of alarms that are new, acknowledged, and returned-to-normal.

As shown in the right-hand portion of FIG. 2, the display page 60 also depicts various links 62. These links 62 are used with the alarm view linker subsystem 50. The alarm view linker subsystem 50 interacts with other subsystem modules and allows an operator to directly link, from the display page 60, to a desired alarm view. Thus, the operator can view alarm information from various perspectives. Specifically, the operator can view the alarms from a system mimic diagram display perspective, or an alarm list perspective.

Alarm View Linker

The alarm view linker subsystem 50 comprises a link module 52, an alarm list generator module 54, a VDU display set module 56, and one or more workstation alarm video display units 26 and associated operator input devices 28. Using the operator input device 28, an operator makes a "link request" for a specific alarm view by designating the appropriate link 62. For example, if the operator input device 28 is a touch-screen, and the operator wishes to view a list of alarms having a Priority I classification, the operator would touch the display page 60 at the link 62 displaying "P-1." Or, if the operator wishes to view alarms associated with a particular system on a system mimic diagram, the operator would touch the display page at the link 62 under the Mimic Display column displaying the particular system designation. The link module 52 recognizes the link request made by the operator, via the operator input device 28, and outputs the appropriate view, either a list or system mimic diagram display, to the associated alarm video display unit 26. The link module 52 retrieves the desired information for display from the alarm list generator module 54 for alarm list display links, or from the VDU display set module 56 for system mimic diagram display links.

The alarm list generator module 54 periodically retrieves the alarm information stored in the current alarm file 42 and generates a series of lists. Each list contains a chronological listing of each alarm within the selected alarm list classification, and includes specific and detailed information about the alarm condition. More specifically, the alarm list generator module 54 generates separate lists for each operational responsibility classification, each priority classification, each system classification, and a total alarm list. For example, according to the preferred embodiment, wherein the system is installed in a nuclear power plant, the alarm list generator module 54 generates the following lists: RO Alarm List, TO Alarm List, ALL Alarm List, Priority 1 Alarm List, Priority 2 Alarm List, Priority 3 Alarm List, and various SYSTEM Alarm Lists.

The RO and TO Alarm Lists contain, respectively, a chronological listing of all RO and TO alarms (both new and acknowledged) and RO and TO alarms that have returned-to-normal (but not yet cleared). These lists can be further filtered, via the operator input device 28, to indicate, respectively, only the new (unacknowledged) RO and TO alarms, only the RO and TO alarms that have returned-to-normal but have not been cleared, or only the RO and TO alarms that have returned-to-normal by alarm priority level. With the latter filtration, Priority 1 alarms are listed first in their chronological order of occurrence, followed concomitantly by Priority 2 alarms then Priority 3 alarms. It should be noted that this filtration scheme is not limiting and other filtration schemes can be used to display various subsets of the RO and TO alarm lists.

The ALL Alarm List contains alarm information similar to that described for the individual RO and TO alarm lists, including the specified filtration scheme. However, this list contains the total number of alarms, regardless of operational responsibility.

The Priority 1, 2, and 3 Alarm Lists contain, respectively, a chronological listing of all Priority 1, 2, and 3 alarms (new and unacknowledged) and Priority 1, 2, and 3 alarms that have returned-to-normal, regardless of operational responsibility. These lists may be further filtered, via the operator input device 28, to indicate, respectively, the Priority 1, 2, and 3 alarms associated with either the RO and/or the TO.

The SYSTEM Alarm Lists each contain a chronological listing of all alarms associated with a particular system. Since each system is typically associated with either the RO or the TO, the operational responsibility information is inherently contained within each list. However, certain systems do have alarms that fall under the operational responsibility of both the RO and TO. For such systems, the particular SYSTEM Alarm List may be further filtered accordingly.

The VDU display set module 56 stores all of the mimic diagram displays associated with each system. The system mimic diagram displays are organized in a hierarchical order, and contain alarm information graphically depicted in the context of plant systems, components, and processes. Similar to the alarm list generator module 54, the VDU display set module 56 periodically retrieves the alarm information from the current alarm list module 42, and updates the mimic diagram displays accordingly.

The VDU display set module 56 includes color coding, shape coding, and dynamic behavior (such as blinking) to indicate the presence of alarms and to indicate the alarm state (i.e., new alarms, acknowledged alarms, returned-to-normal alarms). For example, alarms that appear on a system mimic diagram display as an alphanumeric value will change from a "normal value" color to the "alarm value" color at the point in the system mimic diagram where the alarming parameter is being monitored. If the specified alarm has a dynamic alarm behavior associated with it, such as blinking, this behavior will also be depicted on the system mimic diagram display. Additionally, if a particular component in a system is controlled when an alarm condition occurs, such as a pump or a valve, the component symbol on the system mimic diagram display will be depicted with the appropriate alarm condition color, shape, and/or dynamic behavior.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

I claim:

1. A method of managing a plurality of alarms, comprising:

receiving one or more process parameter signals representative of one or more process parameters;

comparing each of the received process parameter signals with an associated alarm setpoint;

generating an alarm status signal on the basis of the comparison indicating an unanswered new alarm condition or a return-to-normal condition, which signal is different from a signal indicating a new alarm condition;

receiving the alarm status signal;

transmitting an annunciation command signal on the basis of the received alarm status signal; and generating a sound on the basis of the annunciation command signal.

2. A method of managing a plurality of alarms according to claim 1:
wherein the sound generation step comprises:
(1) generating a plurality of tones, each having a different frequency from another, on the basis of the annunciation command signal, and
(2) synthesizing a human voice signal of a specified pitch on the basis of the annunciation command signal.

3. A method of managing a plurality of alarms according to claim 2:
wherein the plurality of tones includes:
(1) a first tone of a first frequency that indicates a new alarm condition,
(2) a second tone of a second frequency that indicates a previously alarming condition has returned to a normal, non-alarming condition, and
(3) a third tone of a third frequency that indicates either a new alarm has not been acknowledged or a previously alarming condition that has returned to a normal, non-alarming condition has not been cleared.

4. A method of managing a plurality of alarms according to claim 3, further comprising:
generating each of the first, second, and third tones for a first predetermined time period.

5. A method of managing a plurality of alarms according to claim 4, further comprising:
generating the third tone repeatedly with a specified period.

6. A method of managing a plurality of alarms according to claim 2, further comprising:
including information related to operational responsibility in the alarm status signal, and
synthesizing the specified pitch of the human voice synthesized in said voice synthesization step on the basis of the information related to operational responsibility.

7. A method of managing a plurality of alarms according to claim 6, further comprising:
including at least a first operator responsibility and a second operator responsibility in the information related to operational responsibility, and
synthesizing, in said voice synthesization step, a substantially male-sounding human voice for the first operator responsibility, and a substantially female-sounding human voice for the second operator responsibility.

8. A method of managing a plurality of alarms according to claim 2:
wherein said voice synthesization step comprises generating the human voice signal substantially immediately following generation of each of the plurality of tones.

9. A method of managing a plurality of alarms according to claim 8:

wherein the alarm status signal includes information related to operational responsibility; and
wherein the specified pitch of the human voice synthesized in said voice synthesization step is determined on the basis of the information related to operational responsibility.

10. A method of managing a plurality of alarms according to claim 9:
wherein the operational responsibility includes at least a first operator responsibility and a second operator responsibility; and
wherein said voice synthesization step comprises synthesizing a substantially male-sounding human voice for the first operator responsibility, and a substantially female-sounding human voice for the second operator responsibility.

11. A method of managing a plurality of alarms according to claim 10:
wherein the first and second operators are a reactor operator and a turbine operator, respectively, in a nuclear power plant.

12. A method of managing a plurality of alarms according to claim 1, further comprising:
receiving the alarm status signal and storing alarm information included in the alarm status signal.

13. A method of managing a plurality of alarms according to claim 12, further comprising:
periodically extracting the alarm information from memory;
categorizing the extracted alarm information into a plurality of predetermined categories; and
displaying the alarm information, for each of the plurality of alarms, arranged into the plurality of predetermined categories.

14. A method of managing a plurality of alarms according to claim 13:
wherein the alarm information includes, for each of the plurality of alarms, alarm status information indicating:
(1) whether the alarm is a new alarm,
(2) whether the alarm, if new, has been acknowledged, and
(3) whether a condition that caused the alarm has returned to a normal, non-alarming condition.

15. A method of managing a plurality of alarms according to claim 13:
wherein the plurality of predetermined categories includes:
(1) operator responsibility for the alarm,
(2) a priority status of the alarm, and
(3) a system with which the alarm is associated.

16. A method of managing a plurality of alarms according to claim 15:
wherein said display step comprises displaying a total number of alarms, within each of the plurality of predetermined categories, having identical alarm status information.

17. A method of managing a plurality of alarms according to claim 16:
wherein said display step further comprises displaying the total number of alarms, irrespective of the plurality of predetermined categories, having identical alarm status information.

18. A method of managing a plurality of alarms according to claim 15:
wherein the operator responsibility category includes a first operator responsibility category and a second operator responsibility category.

19. A method of managing a plurality of alarms according to claim 18:
   wherein the first and second operators are a reactor operator and a turbine operator, respectively, in a nuclear power plant.

20. A method of managing a plurality of alarms according to claim 15:
   wherein the priority status category includes a plurality of predetermined priorities ranked according to an alarm's relative importance.

21. A method of managing a plurality of alarms according to claim 20:
   wherein the predetermined priorities include a first priority, a second priority, and a third priority.

22. A method of managing a plurality of alarms according to claim 21:
   wherein the alarm's relative importance is based on the alarm's relation to reactor safety in a nuclear power plant, and:
   (1) the first priority includes alarms for plant conditions which, if not corrected immediately, will result in a plant shutdown, radioactive release, or major equipment damage,
   (2) the second priority includes alarms for plant conditions which, if not corrected, will require an eventual plant shutdown, or an eventual radioactive release, and
   (3) the third priority includes alarms for plant conditions which, if not corrected, may result in a first or second priority alarm.

23. A method of managing a plurality of alarms according to claim 12, further comprising:
   periodically retrieving and categorizing the stored alarm information into a plurality of predetermined categories;
   storing mimic display information for a plurality of process systems;
   periodically retrieving the stored alarm information and generating the mimic display information for each of the plurality of process systems including the retrieved alarm information therein;
   receiving a first command from an input selection device to select information; and
   transferring the selected information to a video display unit for display thereon,
   wherein the selected information includes one of:
   (1) the alarm information in one of the first plurality of predetermined categories, and
   (2) the alarm information included in one of the plurality of process system mimic displays.

24. A method of managing a plurality of alarms according to claim 23, further comprising:
   filtering the selected alarm information in accordance with a second command from said input selection device.

25. A method of managing a plurality of alarms according to claim 23, further comprising:
   displaying each of the plurality of alarms in chronological order of occurrence.

26. A method of managing a plurality of alarms according to claim 23:
   wherein the plurality of predetermined categories includes:
   (1) operator responsibility for the alarm,
   (2) a priority status of the alarm,
   (3) the process system with which the alarm is associated, and
   (4) a total number of alarms.

27. A method of managing a plurality of alarms according to claim 23:
   wherein the alarm information includes, for each of the plurality of alarms, alarm status information indicating:
   (1) whether the alarm is a new alarm,
   (2) whether the alarm, if new, has been acknowledged, and
   (3) whether a condition that caused the alarm has returned to a normal, non-alarming condition; and
   wherein the selected information displayed on the video display unit includes the alarm status information.

28. A method of managing a plurality of alarms according to claim 24, further comprising:
   selectively displaying specified alarm status information for each of the plurality of alarms in the selected predetermined category in accordance with the second command.

29. A method of managing a plurality of alarms according to claim 24, further comprising:
   selectively displaying alarm information categorized into more than one of the predetermined categories in accordance with the second command.

30. A method of managing a plurality of alarms according to claim 26:
   wherein the operator responsibility category includes a first operator responsibility category and a second operator responsibility category.

31. A method of managing a plurality of alarms according to claim 30:
   wherein the first and second operators are a reactor operator and a turbine operator, respectively, in a nuclear power plant.

32. A method of managing a plurality of alarms according to claim 26:
   wherein the priority status category includes a plurality of predetermined priorities ranked according to an alarm's relative importance.

33. A method of managing a plurality of alarms according to claim 32:
   wherein the predetermined priorities include a first priority, a second priority, and a third priority.

34. A method of managing a plurality of alarms according to claim 33:
   wherein the alarm's relative importance is based on the alarm's relation to reactor safety in a nuclear power plant, and:
   (1) the first priority includes alarms for plant conditions which, if not corrected immediately, will result in a plant shutdown, radioactive release, or major equipment damage,
   (2) the second priority includes alarms for plant conditions which, if not corrected, will require an eventual plant shutdown, or an eventual radioactive release, and
   (3) the third priority includes alarms for plant conditions which, if not corrected, may result in a first or second priority alarm.

* * * * *